United States Patent [19]

Boone

[11] Patent Number: 5,121,567
[45] Date of Patent: Jun. 16, 1992

[54] HELICAL FISHING LURE

[75] Inventor: David L. Boone, Glendale, Ariz.

[73] Assignees: William D. Boone, Phoenix; Rodney W. Jones, Peoria, both of Ariz. ; part interest to each

[21] Appl. No.: 698,999

[22] Filed: May 13, 1991

[51] Int. Cl.$^5$ ............................................. A01K 85/00
[52] U.S. Cl. ...................................... 43/42.24; 43/42.53
[58] Field of Search ................. 43/42.24, 42.53, 42.36, 43/42.06

[56] References Cited

U.S. PATENT DOCUMENTS

| | | | |
|---|---|---|---|
| 1,701,528 | 2/1929 | Clewell | 43/42.36 |
| 2,912,784 | 11/1959 | Carlin | 43/42.24 |
| 3,148,474 | 9/1964 | Smith | 43/42.36 |
| 3,158,952 | 12/1964 | Creme | 43/42.24 |
| 3,245,171 | 4/1966 | Henry | 43/42.24 |
| 3,349,513 | 10/1967 | Jeff | 43/42.24 |
| 3,405,474 | 10/1968 | Lewis | 43/42.24 |
| 3,964,203 | 6/1976 | Williams Jr. | 43/42.06 |
| 4,037,346 | 7/1977 | Holst | 43/42.53 |
| 4,216,605 | 8/1980 | Showalter | 43/42.53 |
| 4,885,867 | 12/1989 | Leal | 43/42.24 |

*Primary Examiner*—Kurt Rowan
*Attorney, Agent, or Firm*—Tod R. Nissle

[57] ABSTRACT

A fishing lure including a helical body portion which retains its helical shape and corkscrews when the lure is pulled through water and which assumes a horizontal orientation when the lure is attached to a fishhook and placed at rest in water.

4 Claims, 3 Drawing Sheets

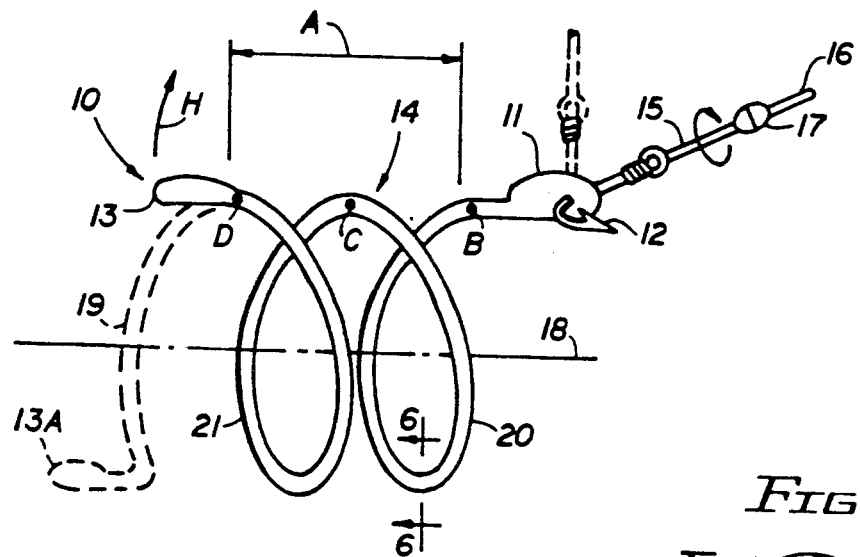
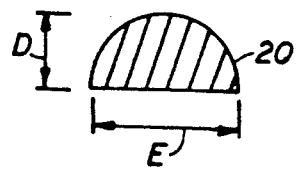
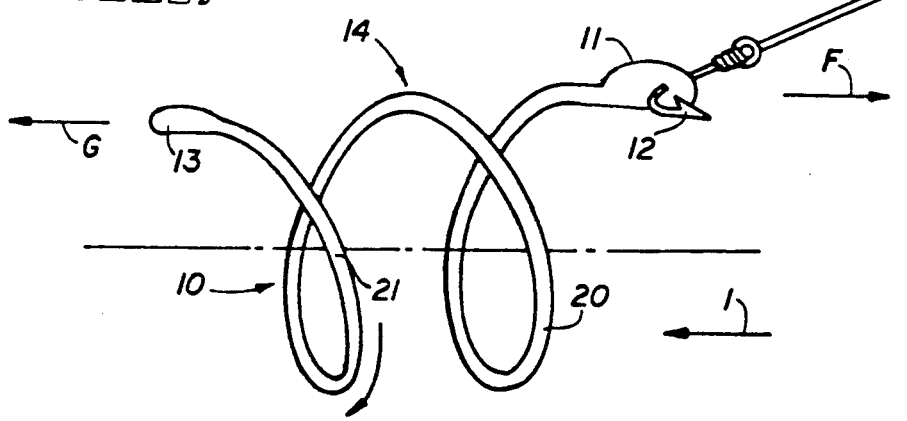
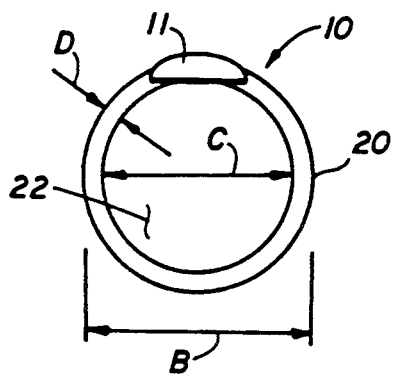

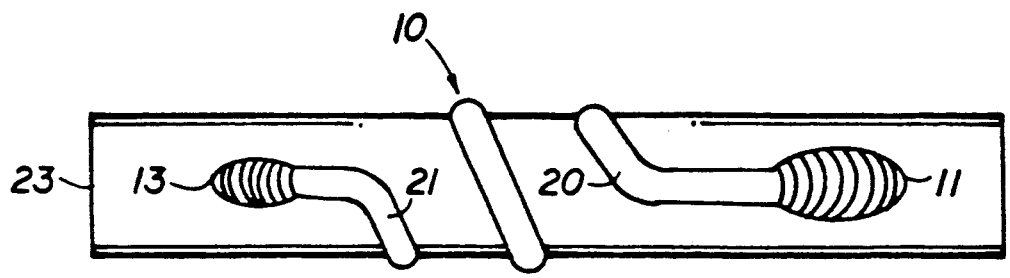
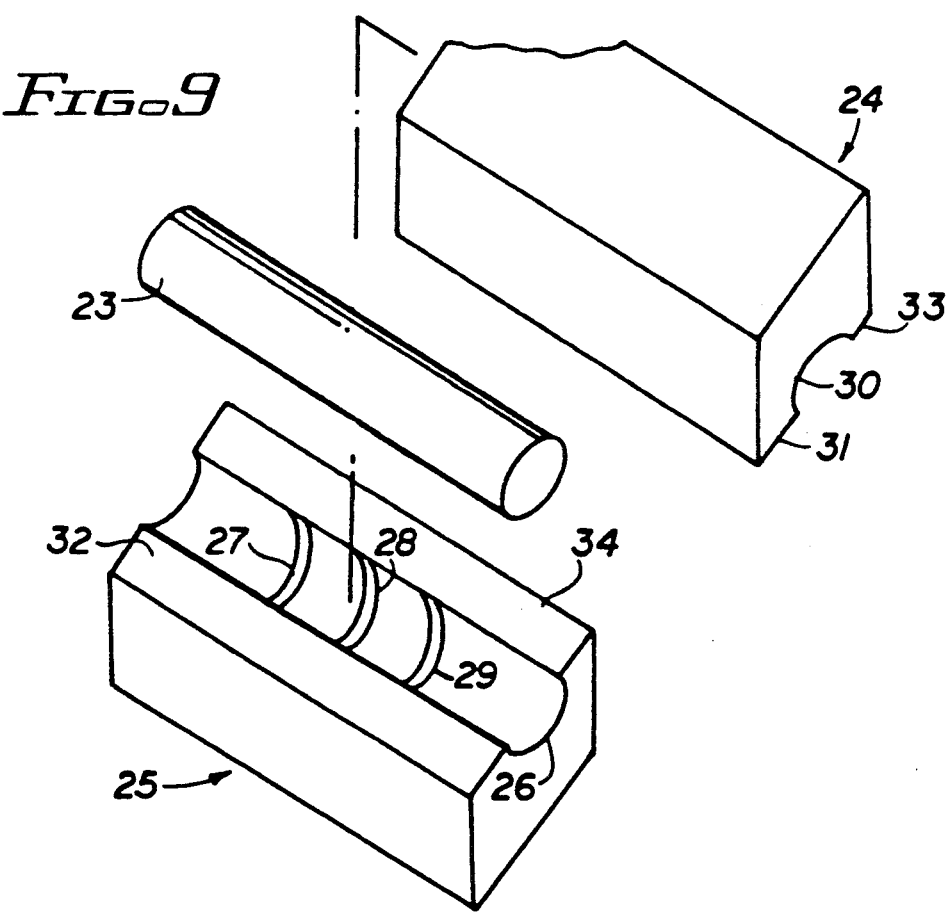

HELICAL FISHING LURE

This invention relates to a fishing lure.

More particularly, the invention relates to a fishing lure including a helical body portion which retains its helical shape and corkscrews when the lure is pulled through still water and which assumes a horizontal orientation when the lure is attached to a fishhook and is immersed at rest in water.

The use of fishing lures which have a spiral configuration when the lure is at rest is well known in the art. See, for example, U.S. Pat. Nos. 3,158,952 to Creme, 4,138,792 to Hill, and 4,316,343 to Creme. Each of such prior art lures, however, lose their spiral appearance and take on elongate or worm-like appearance when the lures are drawn through the water. This can be seen in FIG. 2 of the Creme patent (U.S. Pat. No. 3,158,952); FIG. 1 of the Hill patent (U.S. Pat. No. 4,138,792), and FIG. 1 of the other Creme patent (U.S. Pat. No. 4,316,343). These drawings are included in the drawings herein as prior art.

When a lure is elongated and is substantially linear, the lure is more difficult to see than when it is coiled— much in the same manner that thread is difficult to see when it is in a long linear strand but is easy to see when the thread is wound around a spool. Some lures are difficult to see even when they are coiled because the coiled lure lies in a single plane and is not readily viewed when the edge, and not the face, of the lure is visible. For example, while the lure shown in FIG. 1 of U.S. Pat. No. 3,158,952 to Creme is readily seen when viewing the lure from the top as it is drawn in FIG. 1, when the lure is viewed from the side or edge, the spiral configuration cannot be seen and it is difficult to ascertain whether the lure is anything more than a short, straight length of material.

Another disadvantage of prior art lures is that when the lure is at rest in the water, it assumes an unnatural position. Most elastomeric lures are made from a buoyant plastic, so the lure floats up from the fishhook when the fishhook is in still water. This would cause, for example, the snake lure shown in the Hill patent (U.S. Pat. No. 4,138,792) to take on a vertical configuration, which is not typical for a snake or worm moving through water.

Accordingly, it would be highly desirable to provide an improved fishing lure which has a spiral configuration which enables the lure to be readily viewed from any direction, which retains a spiral configuration when the lure is drawn through the water, and which, when at rest, assumes an orientation similar to the normal orientation of an actual worm or snake which is being imitated by the lure.

Therefore, it is a principal object of the invention to provide an improved fishing lure.

Another object of the invention is to provide an improved fishing lure which has a true three-dimensional helical configuration when the lure is drawn through the water.

A further object of the invention is to provide an improved fishing lure which corkscrews when the lure is drawn through the water.

Still another object of the invention is to provide an improved lure which assumes a horizontal orientation when the lure is attached to a fish hook and immersed at rest in still water.

These and other, further and more specific objects and advantages of the invention will be apparent to those skilled in the art from the following detailed description thereof, taken in conjunction with the drawings, in which:

FIG. 4 is a side elevation view illustrating a helical lure constructed in accordance with the principles of the invention;

FIG. 5 is a front view further illustrating the lure of FIG. 4;

FIG. 6 is a cross-sectional view of the lure of FIG. 4 taken along section line 6—6 thereof;

FIG. 7 is a side elevation view of the lure of FIG. 4 illustrating the mode of operation thereof;

FIG. 8 is a top view illustrating the lure of FIG. 4 on a molding cylinder used in the manufacture of the lure; and, FIG. 9 is perspective assembly view of the three piece mold used in producing the lure of the invention.

Briefly, in accordance with my invention, I provide an improved fishing lure. The lure has an elongate body. The body includes a head at one end thereof for receiving a fishhook in embedded relation thereto; a tail extending rearwardly from the head; and, at least one body portion intermediate the head and tail. The lure at rest includes a preformed curvilinear configuration of elastomeric material to permit yielding flexure in the water to attract fish. The improvement in the lure comprises the preformed curvilinear configuration defining at least two loops of a helix in the body portion. When the helix is at rest in still water, it has a longitudinal axis about which the loops spiral; a length parallel to the longitudinal axis; and, a cross-sectional area transverse the length and including the area occupied by one of the loops and the inner open circular area circumscribed by said one of the loops. The area occupied by said one of the loops is less than fifty percent of the cross-sectional area such that when the fishhook is embedded in the head and the lure is drawn through still water at a selected rate of travel of less than two miles per hour, the helix spirals through the water about the longitudinal axis; the length of the helix increases in spring-like fashion by less than eight times; the inner open helical area decreases by less than fifty percent; and the loops, while being stretched in spring-like fashion, maintain a helix shape and continue to spiral about the longitudinal centerline.

Figure 1:
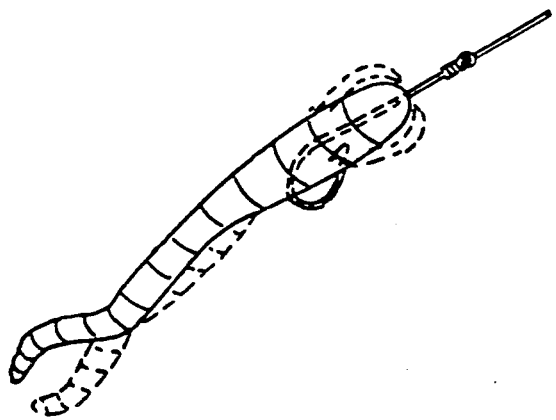
FIG. 1 is a view illustrating a prior art lure moving through the water.
Figure 2:
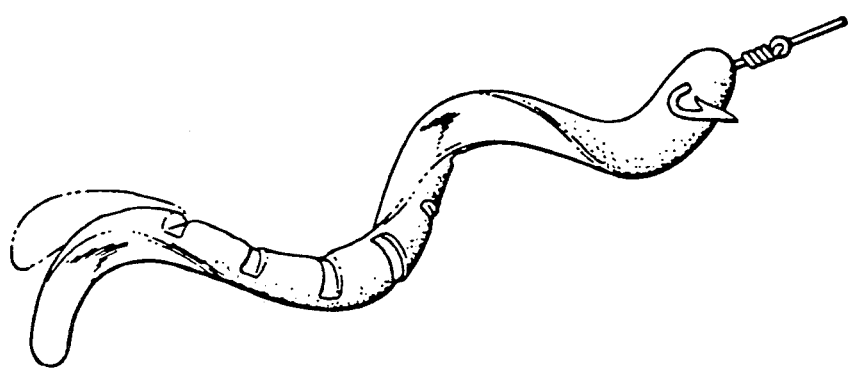
FIG. 2 is a view illustrating another prior art lure moving through the water.
Figure 3:
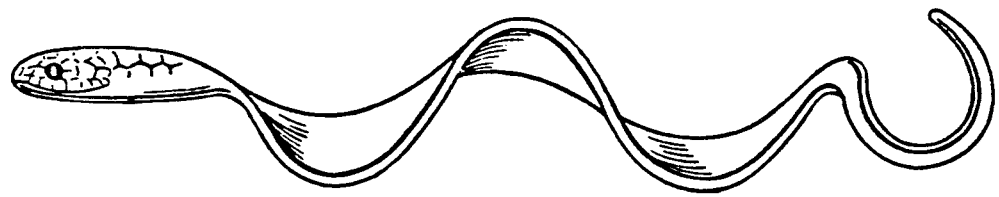
FIG. 3 is a view illustrating still another prior art lure moving through the water.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 to 3 illustrate prior art lures while the lures are being drawn through water.

FIG. 4 illustrates a fishing lure constructed in accordance with the principles of the invention and generally indicated by reference character 10. Lure 10 includes head 11, tail 13, and helical portion 14 intermediate and connected to tail 13 and head 11. Fishing hook 12 is embedded in head 11. Swivel 17 is interposed between the lower end 15 and the upper end 16 of the fishing line so that hook 12 and end 15 can turn without twisting the upper end 16 of the fishing line. The helical portion 14 comprises a preformed curvilinear configuration of elastomeric material which permits yielding flexure of portion 14 in the water so that portion 14 can expand and contract like a spring. In FIG. 4, portion 14 includes two loops of equal diameter which spiral about a longitudinal axis or centerline 18. The first loop 20 begins at point B and extends to point C. The second loop 21 begins at point C and extends to point D. The length of portion 14 is indicated by arrows A and is parallel to longitudinal axis 18. As indicated by dashed lines 13A, the tail 13 can be attached to a lower portion of a loop instead of being attached to the upper portion of a loop as shown in FIG. 4. Tail 13 and head 11 can be attached to portion 14 at any desired location as long as body portion 14 has at least two continuous loops intermediate the head 12 and tail 13. Portion 14 can also, if desired, be attached to another body portion which is intermediate the head 12 and tail 13. Portion 14 can, for example, comprise a leg or arm of lure 10.

While the cross-sectional area of portion 14 can be circular, square, or any other desired shape, the presently preferred semi-circular configuration is illustrated in FIG. 6.

In FIG. 5, the circular cross-sectional area of lure 10 has a diameter indicated by arrows B. The cross-sectional area of lure 10 includes the area occupied by loop 20 and includes the open area 21 encircled by loop 20 in FIG. 5. The diameter of the circular open area 22 is indicated by arrows C. The width of loops 20 and 21 is indicated in FIG. 5 and 6 by arrows D. In FIG. 6, the flat base of loop 20 has a length indicated by arrows E. While in FIGS. 4, 5, and 7, the loops 20 and 21 circumscribe a cylindrical area having a circular cross-section, loops 20 and 21 can, if desired, be formed to circumscribe an elliptically shaped or other generally round area which would, in FIG. 5, have an elliptical or generally round cross-sectional area.

In use, when lure 10 is pulled by the fishing line and hook 12 in the direction of arrow F in the manner indicated in FIG. 7, the length A of portion 14 increases from the "at rest" length of portion 14 indicated in FIG. 4. Lure 10 corkscrews through the water in the manner indicated by arrow J. In FIG. 4, lure 10 is at rest in still water. As the length of portion 14 increases, tail 13 moves in the direction of arrow G away from head 11, loops 20 and 21 spread apart, and the size of the open area 22 circumscribed by a loop 20, 21 decreases. If portion 14 is completely stretched out so it is nearly linear in the manner of the prior art lures shown in FIGS. 1 to 3, then area 22 is quite small or is substantially eliminated. In order for the lure of the invention to maintain its helical shape and function in accordance with the objectives of the invention, several structural features are preferred. First, it is preferred that the size of a loop 20 or 21 be such that the loop 20 takes up no more than 50% of the cross sectional area of the lure 10 shown in FIG. 5. Preferably, the loop 20 is sized to take up only 35% or less of the cross-sectional area of the lure 10. The larger the size of the loop 20 with respect to the cross-sectional area of the lure, the greater the flow resistance produced by the loop 20 when the lure is pulled through the water. As the flow resistance increases, the lure 10 tends to be lengthened a greater amount as it moves through the water. The length of the portion 14 preferably should increase by no more than about eight times over the length, indicated by arrows A in FIG. 4, of the portion 14 when the lure 10 is at rest. Second, since it is desired to retain the helical configuration of portion 14 when the lure is drawn through the water, the size of area 22 should not decrease by more than about 50% when the lure is drawn through the water. If the size of area 22 decreases by more than 50%, then the portion 14 is beginning to straighten out and become more nearly linear like the prior art lures shown in FIGS. 1 to 3. Third, at least two loops are required in portion 14. A single loop tends to straighten out in the manner shown in FIG. 1 of U.S. Pat. No. 4,316,343 to Creme (shown in FIG. 1 herein) and tends to not retain the helical configuration of the invention when the lure is drawn through the water.

Lures are normally drawn through the water at relatively slow speeds. The lure 10 of the invention is intended to maintain its helical configuration and to spiral about axis 18 when the lure is drawn through the water at speeds of less than two miles per hour, preferably at speeds of 0.75 miles per hour or less.

Lures are commonly molded from PLASTISOL ® or other lightweight, pliable, buoyant plastic materials. In one embodiment of the invention, lure 10 is produced from a plastic which has a specific gravity about equal to that of water such that when head 11 is affixed to hook 12 in the manner shown in FIG. 4 and the hook 12 and lure 10 are submersed in still water at rest, lure 10 assumes the horizontal orientation illustrated in FIG. 4. If in FIG. 4 lure 10 were made entirely of a buoyant material, then tail 13 would tend to float upwardly in the direction of arrow H when lure 10 was at rest in still water. In another embodiment of the invention, lure 10 is fabricated from a slightly buoyant material so that when lure 10 is pulled very slowly through the water or when hook 12 is stationery in the water and a slow current is flowing over lure 10 in the direction of arrow I in FIG. 7, the lure 10 stabilizes in the horizontal orientation of FIG. 4. The helical configuration of portion 14 facilitates the movement of lure 10 to the horizontal orientation of FIG. 4 when lure 10 is pulled slowly through the water. Utilizing loops 20, 21 of equal size also facilitates the hydrodynamic stability of loops 20, 21 as lure 10 moves through water.

A three piece mold is presently used to make the lure of the invention and is illustrated in FIG. 9. This mold includes a cylindrical shaft 23 and a pair of opposing blocks 24 and 25. Block 25 has semi-cylindrical groove 26 shaped and dimensioned to conform to and partially circumscribe shaft 23. Grooves 27 to 29 formed in groove 26 receive elastomeric material which forms lure 10. Similarly, block 24 includes semi-cylindrical groove 30 which is shaped to conform to and partially circumscribe shaft 23. Groove 30 also includes grooves (not visible) which receive elastomeric material used to produce lure 10. When the mold of FIG. 9 is assembled, shaft 23 is intermediate, contacts, and is held against grooves 30 and 36; flat planar surface 32 contacts flat planar surface 31; and, flat planar surface 34 contacts flat planar surface 33. Means (not shown) is provided for injecting elastomeric material into grooves 27 to 29 and into the grooves formed in groove 30.

FIG. 8 illustrates lure 10 on shaft 23 after the mold of FIG. 7 is assembled, elastomeric material is injected into grooves 27-29 and into the grooves (not visible) formed in groove 30, the elastomeric material is allowed to set or harden, and blocks 24 and 25 are removed from shaft 23. In FIG. 8, lure 10 is removed from shaft 23 by grasping head 11 and peeling lure 10 off of shaft 23. The loops 20, 21 of the lure 10 of FIG. 8 have a circular cross-sectional area as illustrated in FIG. 6.

The lure of the invention appears to be successful in attracting fish both because the fish can better view the helical configuration of the lure from any direction and from a distance and because of the combined spring-like—corkscrew motion of the lure 10.

Having described my invention in such terms as to enable those skilled in the art to understand and practice it, and having identified the presently preferred embodiments thereof, I claim:

1. In an artificial fishing lure having an elongate body including
   a head at one end thereof for receiving a fishhook
   a tail extending rearwardly from said head, and
   at least one body portion intermediate said head and said tail,
   wherein said lure at rest includes a preformed curvilinear configuration of elastomeric material to permit yielding flexure in the water to attract fish,
the improvement therein comprising
   said preformed curvilinear configuration defining at least two loops of a helix in said body portion, said helix having, at rest in still water,
      (a) a longitudinal axis about which said loops spiral;
      (b) a length parallel to said longitudinal axis;
      (c) a cross-sectional area transverse said length and including
         (i) an area occupied by one of said loops, and
         (ii) an inner open circular area circumscribed by said one of said loops,
      said area occupied by said one of said loops being less than fifty percent of said cross-sectional area such that when said fishhook is received by said head and said lure is drawn through still water at a selected rate of travel of less than two miles per hour,
      (d) said length of said helix increases in spring-like fashion;
      (e) said inner open circular area decreases by less than fifty percent; and,
      (f) said loops, while being stretched in spring-like fashion, maintain a helix shape.

2. A method for molding at least a portion of an artificial fishing lure having an elongate body including
   a head one end thereof for receiving a fishhook,
   a tail extending rearwardly from said head, and
   at least one body portion intermediate said head and said tail,
   wherein said lure at rest includes a preformed curvilinear configuration of elastomeric material to permit yielding flexure in the water to attract fish, said preformed curvilinear configuration defining at least two loops of a helix in said body portion, said helix having, at rest in still water,
   a longitudinal axis about which said loops spiral,
   a length parallel to said longitudinal axis,
   a cross-sectional area transverse said length and including
      an area occupied by one of the loops, and
      an inner open circular area circumscribed by said one of said loops,
   said method molding said preformed curvilinear configuration and including the steps of
   (a) assembling a three part mold including
      i) a first elongate member including a round outer surface,
      (ii) a second member having a first surface shaped and dimensioned to generally conform to and partially circumscribe said first elongate round member,
      (iii) a third member having a second surface shaped and dimensioned to generally conform to and partially circumscribe said first member, said first and second surfaces generally completely circumscribing and enclosing said round surface of said first member, said mold being assembled by placing said first and second surfaces adjacent said round outer surface to circumscribe and enclose said round surface, and
      (iv) a continuous groove formed on at least one of said outer surface, first surface, and second surface to receive molding material to form said curvilinear configuration;
   (b) injecting elastomeric material into said continuous groove;
   (c) allowing said elastomeric material to set;
   (d) separating said second and third members from said first member; and,
   (e) removing said set elastomeric material from said mold.

3. The method of claim 2 wherein said curvilinear configuration is shaped and dimensioned such that when said lure is drawn through still water at a selected rate of travel of less than two miles per hour,
   (a) said length of said helix increases in spring-like fashion;
   (b) said inner open circular area decreases by less than fifty percent when said length of said helix increases; and,
   (c) said loops, while being stretched in spring-like fashion, maintain a helix shape.

4. The method of claim 3 wherein said area occupied by said one of said loops is less than fifty percent of said cross-sectional area.

* * * * *